(12) United States Patent
Li et al.

(10) Patent No.: US 10,199,886 B2
(45) Date of Patent: Feb. 5, 2019

(54) SINGLE PHASE BRUSHLESS MOTOR AND POWER TOOL UTILIZING SAME

(71) Applicant: Johnson Electric S.A., Murten (CH)

(72) Inventors: Yue Li, Hong Kong (CN); Tao Zhang, Shenzhen (CN); Chui You Zhou, Shenzhen (CN); Jie Chai, Shenzhen (CN); Jun Jie Chu, Hong Kong (CN); Xiao Bing Zuo, Shenzhen (CN); Yong Wang, Shenzhen (CN); Yong Li, Shenzhen (CN)

(73) Assignee: JOHNSON ELECTRICS S.A., Murten (CH)

( * ) Notice: Subject to any disclaimer, the term of this patent is extended or adjusted under 35 U.S.C. 154(b) by 190 days.

(21) Appl. No.: 15/254,379

(22) Filed: Sep. 1, 2016

(65) Prior Publication Data

US 2017/0063179 A1  Mar. 2, 2017

(30) Foreign Application Priority Data

Sep. 1, 2015 (CN) .......................... 2015 1 0552087
Apr. 7, 2016 (CN) .......................... 2016 1 0214432

(51) Int. Cl.
*H02K 29/03* (2006.01)
*H02K 1/14* (2006.01)
*H02K 1/27* (2006.01)
*H02K 7/14* (2006.01)
*H02K 21/16* (2006.01)

(52) U.S. Cl.
CPC ............ *H02K 1/146* (2013.01); *H02K 1/276* (2013.01); *H02K 1/278* (2013.01); *H02K 1/2726* (2013.01); *H02K 7/145* (2013.01); *H02K 21/16* (2013.01); *H02K 29/03* (2013.01); *H02K 2213/03* (2013.01)

(58) Field of Classification Search
CPC .... H02K 2201/06; H02K 29/03; H02K 1/146; H02K 7/145
See application file for complete search history.

(56) References Cited

U.S. PATENT DOCUMENTS 4,748,362 A * 5/1988 Hedlund ................ H02K 1/246
                                              310/162
5,773,908 A * 6/1998 Stephens ................ H02K 1/146
                                              310/156.47
6,744,171 B1 * 6/2004 Kolomeitsev .......... H02K 1/146
                                              310/254.1

(Continued)

*Primary Examiner* — Dang Le
(74) *Attorney, Agent, or Firm* — Muncy, Geissler, Olds & Lowe, P.C.

(57) ABSTRACT

A single phase brushless motor and a power tool are provided. The single phase brushless motor includes a stator and a rotor. The stator includes a stator core and windings wound around the stator core. The stator core includes a yoke and at least two teeth. The tooth includes a tooth body and a tooth tip. The tooth tip includes first and second pole shoes. The two pole shoes of each tooth are symmetrical about a center line of the tooth body. Each tooth defines a positioning groove facing the rotor between the two pole shoes. Pole shoes of adjacent two of the at least two teeth are spaced apart by a slot opening. A width of the positioning groove is greater than a width of the slot opening. The peak value of the cogging torque of the motor is increased, and the motor has a large startup torque.

16 Claims, 11 Drawing Sheets

(56) References Cited

U.S. PATENT DOCUMENTS

| | | | | |
|---|---|---|---|---|
| 7,143,503 B2* | 12/2006 | Ionel | ................... | H02K 1/2733 |
| | | | | 29/596 |
| 7,550,891 B2* | 6/2009 | Kim | ...................... | H02K 1/08 |
| | | | | 310/156.53 |
| 8,110,957 B2* | 2/2012 | Murakami | ............ | H02K 1/278 |
| | | | | 310/156.38 |

* cited by examiner

SINGLE PHASE BRUSHLESS MOTOR AND POWER TOOL UTILIZING SAME

CROSS REFERENCE TO RELATED APPLICATIONS

This non-provisional patent application claims priority under 35 U.S.C. § 119(a) from Patent Application No. 201510552087.8 filed in The People's Republic of China on Sep. 1, 2015, and Patent Application No. 201610214432.1 filed in The People's Republic of China on Apr. 7, 2016.

FIELD OF THE INVENTION

The invention relates to motors, and in particular to a single phase brushless motor and a power tool utilizing the single phase brushless motor.

BACKGROUND OF THE INVENTION

Single phase motors have the advantage of low cost. However, because of its poor startup capability, the use of the single phase motor in applications requiring large startup torque, such as in power tools, has been restricted. Therefore, a single phase brushless motor with strong startup capability is urgently desired.

SUMMARY OF THE INVENTION

Thus, there is a desire for a single phase brushless motor which can overcome the above shortcomings.

In one aspect, a single phase brushless motor is provided which includes a stator and a rotor rotatable relative to the stator. The stator includes a stator core and windings wound around the stator core. The stator core includes a yoke and at least two teeth extending from the yoke. The tooth includes a tooth body and a tooth tip disposed at a distal end of the tooth body. The tooth tip comprises a first pole shoe and a second pole shoe respectively extending to two sides of the tooth. The two pole shoes of each tooth are symmetrical about a center line of the tooth body of the tooth. Each tooth defines a positioning groove facing the rotor between the two pole shoes. The pole shoes of adjacent two of the at least two teeth are spaced apart by a slot opening. A width of the positioning groove is greater than a width of the slot opening.

Preferably, the at least two teeth extend inward from the yoke, the first pole shoes and the second pole shoes of the at least two teeth define a space therebetween, and the rotor is rotatably received in the space.

Preferably, a portion of a sidewall of the positioning groove adjacent a groove bottom of the positioning groove is steeper than a portion of the sidewall away from the groove bottom of the positioning groove.

Preferably, the slot opening has a funnel-shaped cross section and has a width at a radial inner side less than a width at a radial outer side thereof, and the width of the positioning groove is greater than the width of the slot opening at the radial outer side thereof.

Preferably, the width of the positioning groove is greater than two times of the width of the slot opening at the radial outer side thereof.

Preferably, the slot opening has a rectangular shaped cross section.

Preferably, the width of the positioning groove is greater than or equal to a width of the tooth body of the tooth.

Preferably, a cross section of the positioning groove is V-shaped or arc-shaped.

Preferably, the rotor comprises a plurality of permanent magnetic poles arranged along a circumferential direction of the rotor, an outer circumferential surface of the rotor is located on a same cylindrical surface, the two pole shoes of each tooth and the rotor define a gap therebetween with an even thickness.

Preferably, the rotor comprises a rotor core, the permanent magnetic poles is formed by a permanent magnet arranged around an outer side of the rotor core.

Preferably, a distance from an inner circumferential surface of each pole shoe to a center of the rotor gradually increases in a direction approaching a center line of the corresponding tooth body.

Preferably, the rotor comprises a plurality of permanent magnetic poles arranged along a circumferential direction of the rotor, an outer radius of the rotor gradually decreases from a circumferential center to two circumferential sides of each permanent magnetic pole and the rotor is symmetrical about the circumferential center of the permanent magnetic pole.

Preferably, the rotor further comprises a rotor core, the permanent magnetic poles are formed by a plurality of permanent magnets embedded in the rotor core, and an outer radius of the rotor core gradually decreases from the circumferential center to two sides of each permanent magnet.

Preferably, a distance from an inner circumferential surface of each pole shoe to a center of the rotor gradually increases in a direction approaching a center line of the corresponding tooth body.

Preferably, the rotor further comprises a rotor core, the permanent magnetic poles are formed by a plurality of permanent magnets mounted to an outer circumferential surface of the rotor core, the rotor core is a cylindrical body, and a thickness of each permanent magnet gradually decreases from the circumferential center to two sides of each permanent magnet.

Preferably, a radial thickness of the two pole shoes of each tooth gradually decreases in a direction away from the positioning groove.

Preferably, the yoke is of a closed ring shape, a closed frame shape, or an opened frame shape.

In another aspect, a power tool is provided that employs the above described single phase brushless motor. The single phase brushless motor has same startup capability in either direction (i.e. having a same accelerating region of the electromagnetic torque accelerating region, e.g. the accelerating region is 90 degrees of electric angle in both directions).

When compared with the prior art, the present invention has the following advantages: the present invention can produce a large peak value of the cogging torque, which prevents the rotor from stopping at the dead point position and increases the startup torque of the motor.

DETAILED DESCRIPTION OF THE PREFERRED EMBODIMENTS

Below, the present invention will be described further in conjunction with embodiments illustrated in the drawings.

First Embodiment

Figure 1:
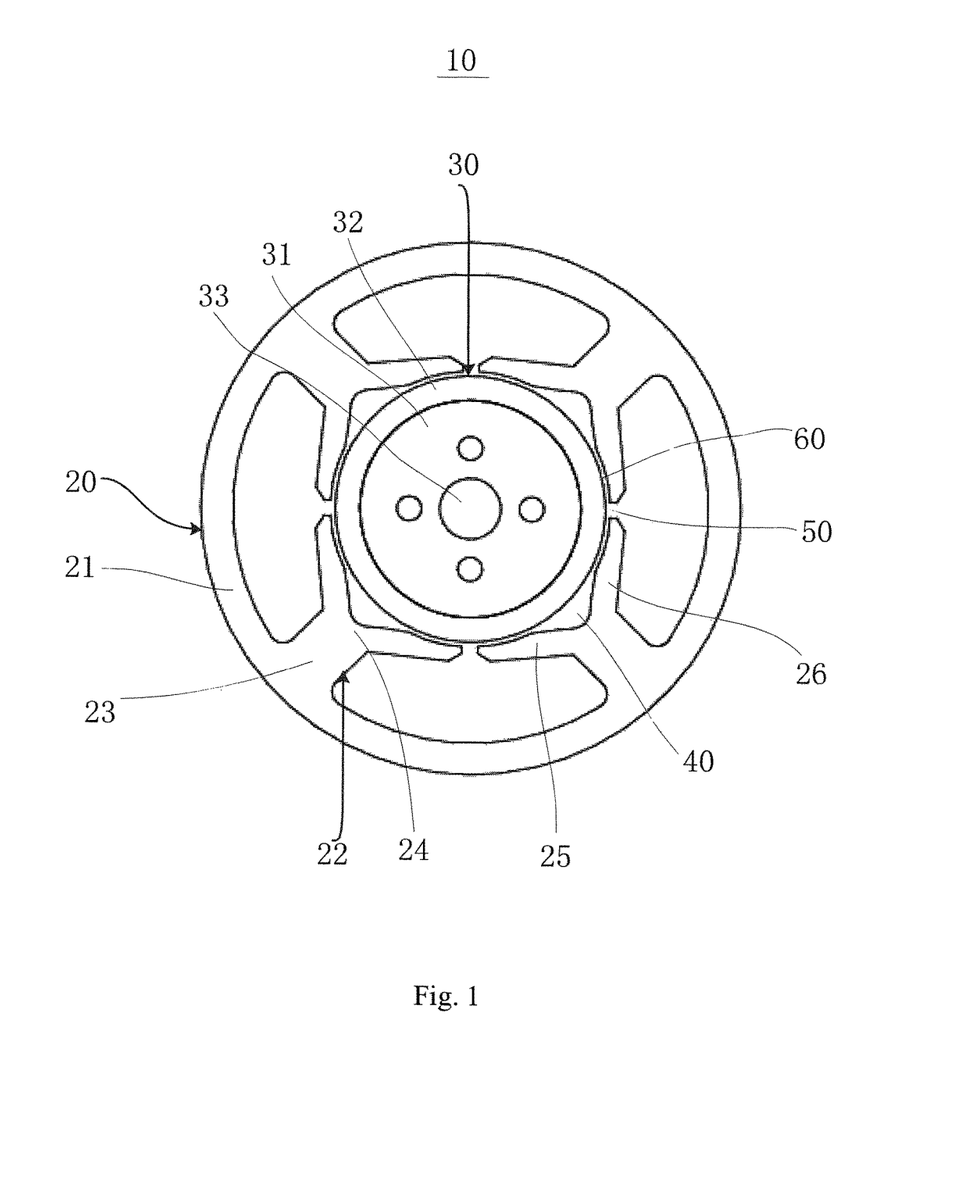
FIG. 1 and FIG. 2 are simplified schematic views of a single phase brushless motor according to a first embodiment of the present invention.

Referring to FIG. 1, a single phase brushless motor 10 in accordance with a first embodiment of the present invention includes a stator 20 and a rotor 30 rotatable relative to the stator 20.

The stator 20 includes a stator core made of a magnetic-conductive soft magnetic material such as silicon steel, and windings 28 (see FIG. 5) wound around the stator core. The stator core includes a yoke 21 and at least two teeth 22 extending inward from the yoke 21. The tooth 22 includes a tooth body 23 and a tooth tip 24 formed at a distal end of the tooth body 23. The windings 28 may be wound around the tooth body 23. The tooth tip 24 includes two pole shoes 25, 26 extending to two sides of the tooth, respectively. The rotor 30 is received in a space defined between the pole shoes 25, 26 of the at least two teeth 22. The two pole shoes 25, 26 of each tooth 22 are symmetrical about a radial center line of the tooth body 23 of the corresponding tooth 22, i.e. pole faces of the two pole shoes 25, 26 facing the rotor 30 are the same. In this description and the claims, the pole face refers to an inner surface of the pole shoe facing the rotor 30.

Figure 3:
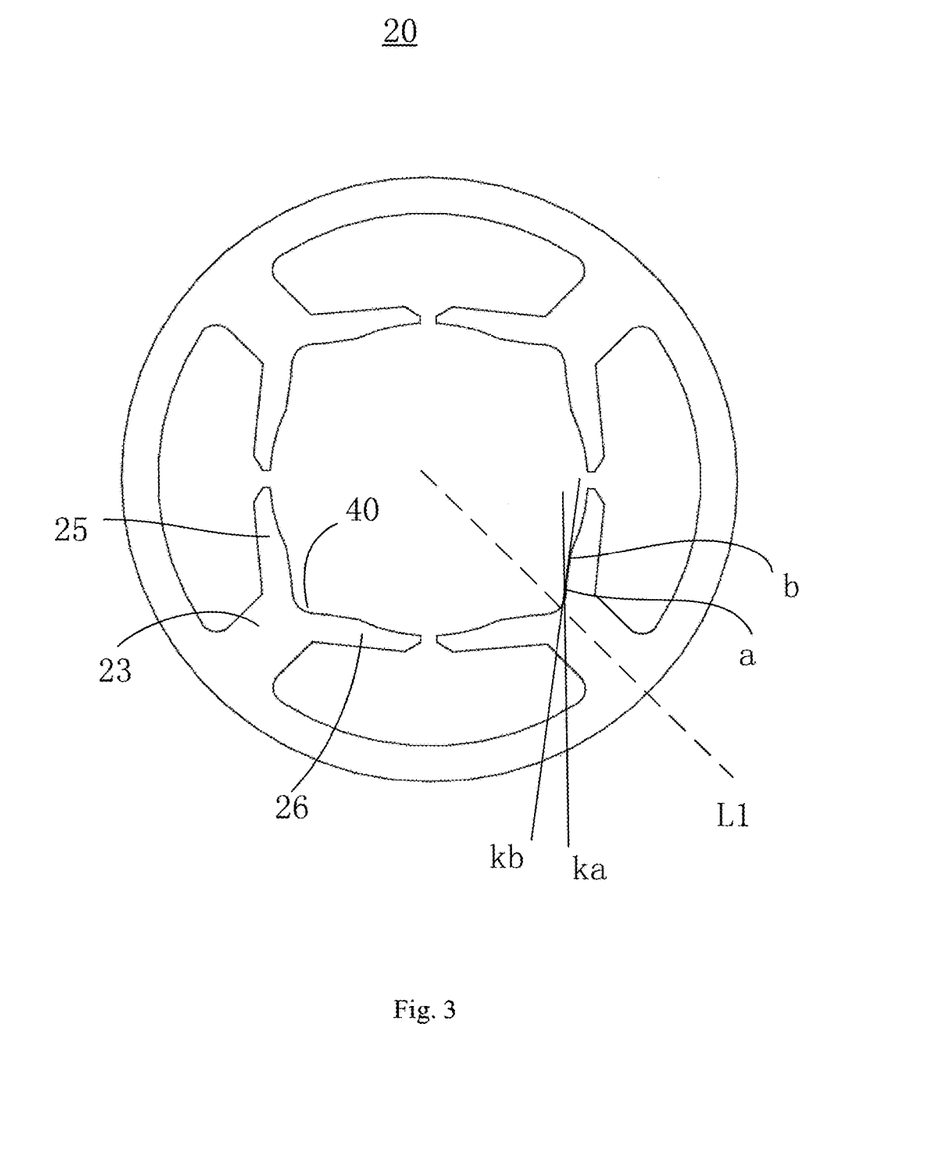
FIG. 3 is a simplified view of a stator core of the motor of FIG. 1.

A positioning groove 40 facing the rotor 30 is defined between two pole shoes 25, 26. Preferably, a cross section of the positioning groove 40 has a smooth V-shape. The radial center line of the tooth body 23 passes through a center of the positioning groove 40. For each sidewall of the positioning groove 40, a sidewall portion adjacent a groove bottom is steeper than a sidewall portion away from the groove bottom. For example, as shown in FIG. 3, L1 indicates a center line of the tooth body 23 or the positioning groove 40, a sidewall portion a is adjacent the groove bottom, a sidewall portion b is farther away from the groove bottom than the sidewall portion a, and an angle formed between a tangential line ka of the sidewall portion a and the center line L1 of the positioning groove 40 is less than an angle formed between a tangential line kb of the sidewall portion b and the center line L1 of the positioning groove 40. This design can increase a peak value of the cogging torque.

In this embodiment, a circumferential width of the positioning groove 40 is greater than a circumferential width of the tooth body 23 of the tooth 22. In an alternative embodiment, the circumferential width of the positioning groove 40 is less than or equal to a circumferential width of the tooth body 23 of the tooth 22.

A slot opening 50 is defined between each two adjacent pole shoes of the at least two different teeth 22. In this embodiment, the slot opening 50 has a funnel-shaped cross section and has a width at a radial inner side less than a width at a radial outer side thereof. This design can further increase the peak value of the cogging torque.

Figure 2:
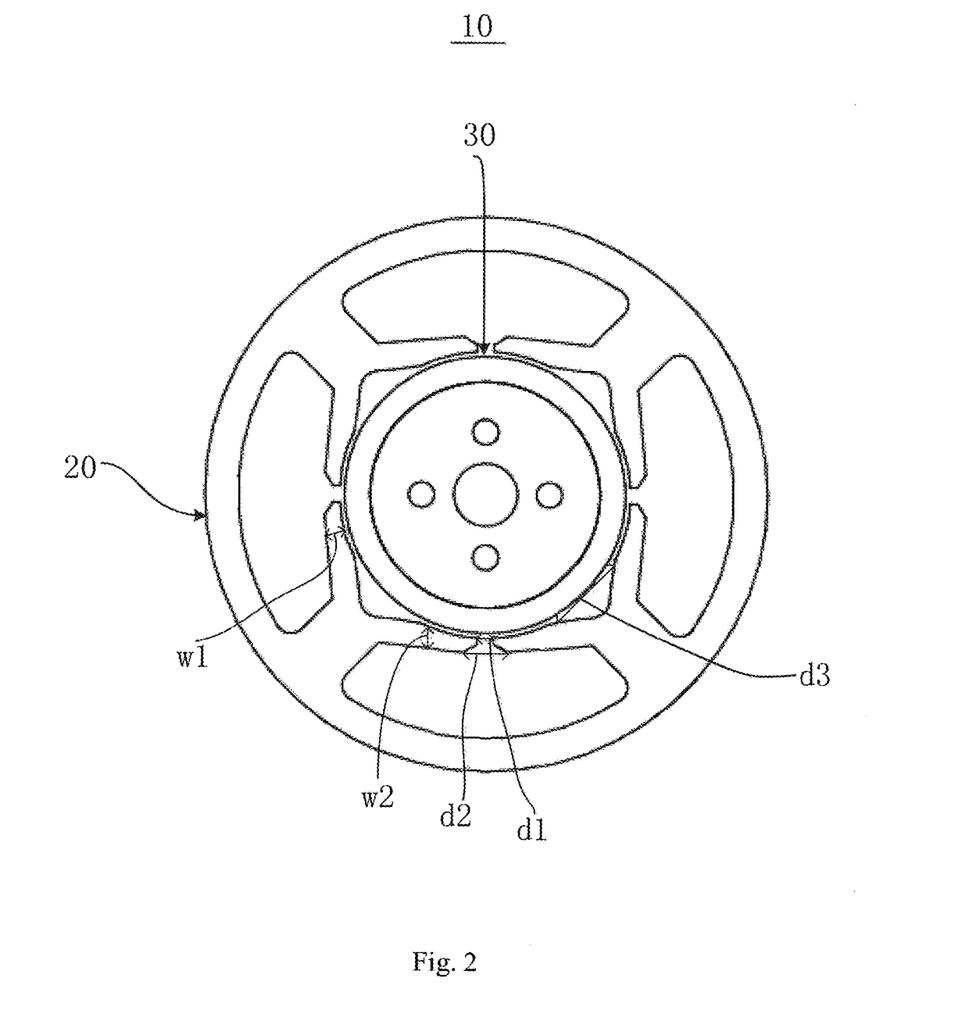

Referring to FIG. 2, the circumferential width at the radial inner side of the slot opening 50 is indicated by d1, the circumferential width at the radial outer side of the slot opening 50 is indicated by d2, the circumferential width of an opening of the positioning groove 40 is indicated by d3, and the radial thicknesses of the two pole shoes 25, 26 are indicated by w1 and w2, respectively. The following dimensional relationships are satisfied: d1<d2, and d3>2d2, i.e. the circumferential width at the radial inner side of the slot opening 50 is less than the circumferential width at the radial outer side of the slot opening 50, the circumferential width of the positioning groove 40 is greater than the circumferential width at the radial outer side of the slot opening 50 (i.e. the maximum width of the slot opening 50) and preferably, greater than two times of the maximum width of the slot opening 50. Such dimensional relationships are also for the purposes of increasing the peak value of the cogging torque of the motor 10.

In this embodiment, preferably, the radial thicknesses w1, w2 of the two pole shoes 25, 26 of each tooth 22 gradually decrease in a direction away from the positioning groove 40. That is, the two pole shoes 25, 26 of each tooth 22 have a greater magnetic reluctance at a position closer to the corresponding slot opening 50.

Preferably, an outer circumferential surface of the rotor 30 is located on a same cylindrical surface. In particular, the rotor 30 includes a rotary shaft 33, a rotor core 31 fixed around the rotary shaft 33, a permanent magnet 32 fixed around an outer side of the rotor core 31. The permanent magnet 32 forms a plurality of permanent magnetic poles along a circumferential direction of the rotor 30. In this embodiment, pole faces of the two pole shoes 25, 26 of each tooth 22 are located on a same cylindrical surface centered at the center of the rotor 30, except for an area of the positioning groove 40, thus forming a gap 60 with an even thickness between the pole faces of the pole shoes 25, 26 and the outer circumferential surface of the rotor 30. This design facilitates increasing the slope of the increase of cogging torque at the unstable point of the rotor 30, and increase the cogging torque of the motor 10 as well.

Figure 4:
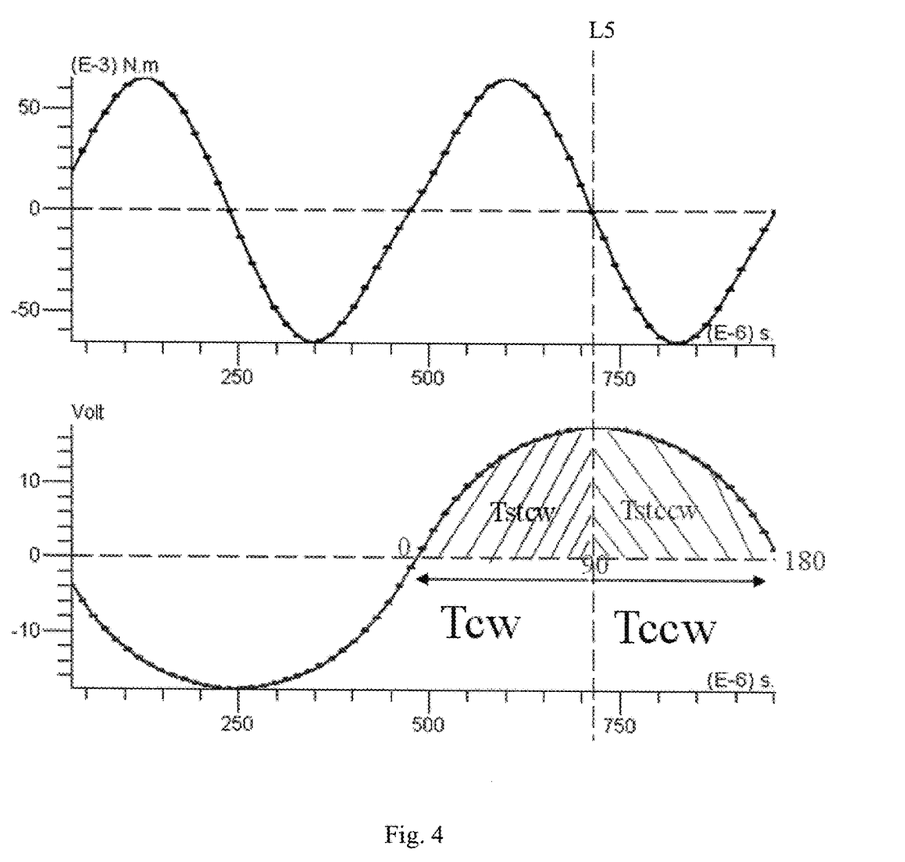
FIG. 4 is a graph showing curves of the cogging torque and electromagnetic torque of the motor of FIG. 1.

FIG. 4 is a graph showing curves of the cogging torque and electromagnetic torque of the motor of the embodiment above. The upper graph of FIG. 4 is the curve of cogging torque of the motor 10 during one electric cycle, with the horizontal ordinate representing time and the vertical ordinate representing the cogging torque value. The cogging torque has a large peak value and its curve is a smooth and regular sin wave. It should be understood that, during the course from rotating to stopping of the motor 10, the rotor 30 is probably to stop at a position where the cogging torque is less than the frictional torque. Therefore, enlarging the peak value of the cogging torque and increasing the slope of the increase of the cogging torque at the unstable point can reduce the stop positions of the motor when not energized and hence effectively prevent the rotor 30 from stopping at the dead point position.

The lower graph of FIG. 4 shows the curve of the electromagnetic torque of the motor 10 during one electric cycle, with the horizontal ordinate representing time and the vertical ordinate representing the electromagnetic torque value. For example, when the rotor 30 stops at a position indicated by the broken line L5, in this case, the cogging torque is zero and the electromagnetic torque has the maximum value and, therefore, the motor 10 has a maximum startup torque at this position. It should be understood a direction of the current flowing through the windings 28 of the stator 20 during startup can be inverted by a motor controller (not shown) connected with the stator windings 28. Different directions of the current of the stator windings 28 during startup cause the rotor 30 to be started in different directions. Therefore, the rotor 30 has bidirectional startup capability. For example, when the stator windings 28 are supplied with a current in a counterclockwise direction, an accelerating region of the electromagnetic torque is from 90 to 180 degrees of electric angle; when the stator windings 28 are supplied with the current in a clockwise direction, the accelerating region of the electromagnetic torque is from 90 to 0 degrees of electric angle. Therefore, the motor rotating in either direction can produce the sufficient large electromagnetic torque within 90 degrees of electric angle, such that the motor 10 has a large startup torque, which greatly enhances the startup capability of the motor 10. This is particularly advantageous in starting under high load and suitable for use in applications requiring large startup torque. In this embodiment, the motor 10 is a single phase brushless direct current motor.

Figure 5:
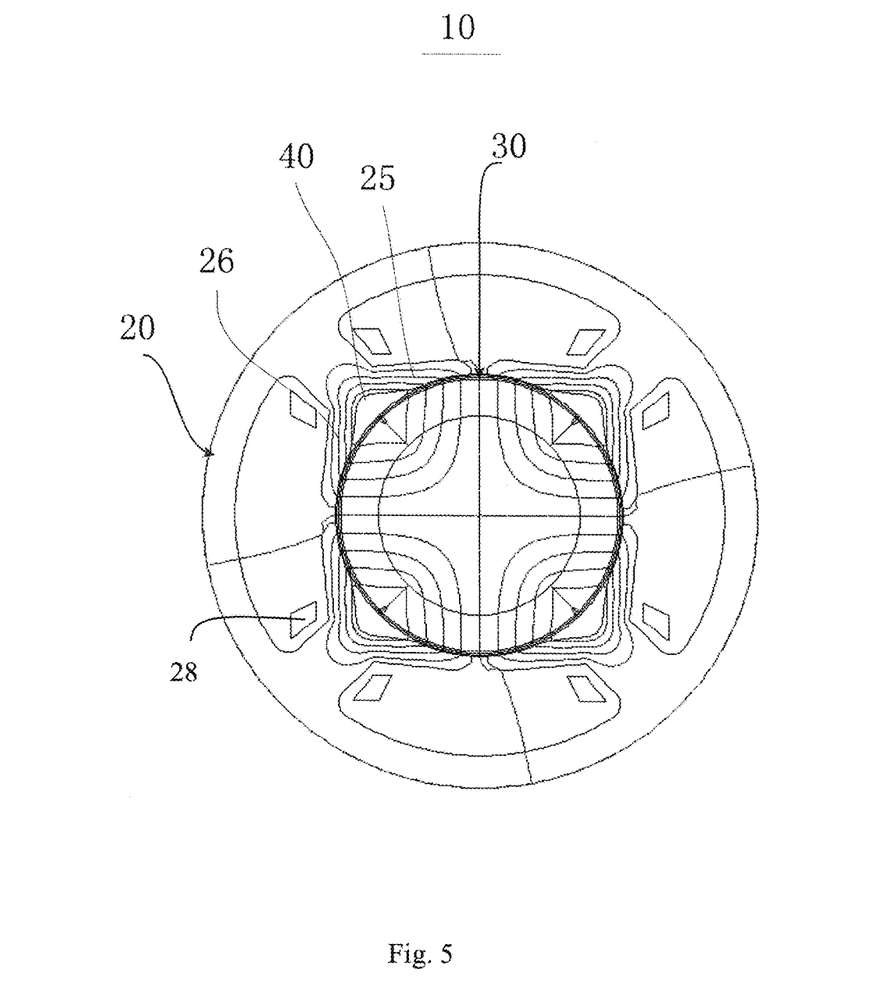
FIG. 5 illustrates a magnetic flux distribution of the single phase brushless motor of FIG. 1.
Figure 11:
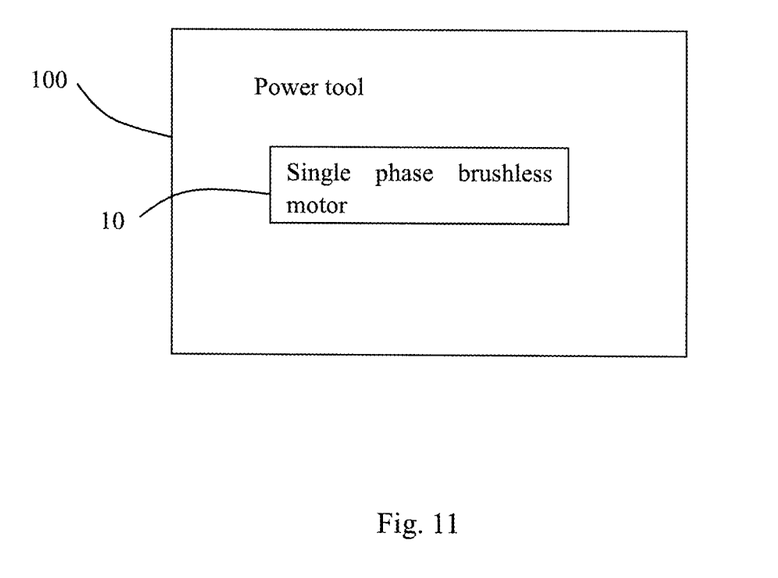
FIG. 11 illustrates a power tool including the above single phase brushless motor.

FIG. 5 illustrates a position at which the rotor 30 stops when the motor is in a natural state. Referring to FIG. 5, at this position, the center of the permanent magnetic pole is as close to the pole shoe as possible and deviates from a center of the stator pole by an electric angle of 90 degrees (i.e. the startup angle of the motor is the electric angle of 90 degrees), and each two adjacent permanent magnetic poles form a shorter magnetic circuit through the two pole shoes 25, 26 of one corresponding tooth 22. Because the two pole shoes 25, 26 of each tooth 22 are symmetrical with each other, the pole shoes 25, 26 have the same number of magnetic circuits passing therethrough, i.e. the number of the magnetic circuits on two sides of the positioning groove 40 is the same. As shown in FIG. 4, at this position indicated by the broken line L5, the cogging torque is zero but the electromagnetic torque has the maximum value, thereby enhancing the startup capability of the motor 10, which is particularly suitable for use in applications having equal requirements for motor startup in both directions, such as in power tools 100 (see FIG. 11).

Second Embodiment

Figure 6:
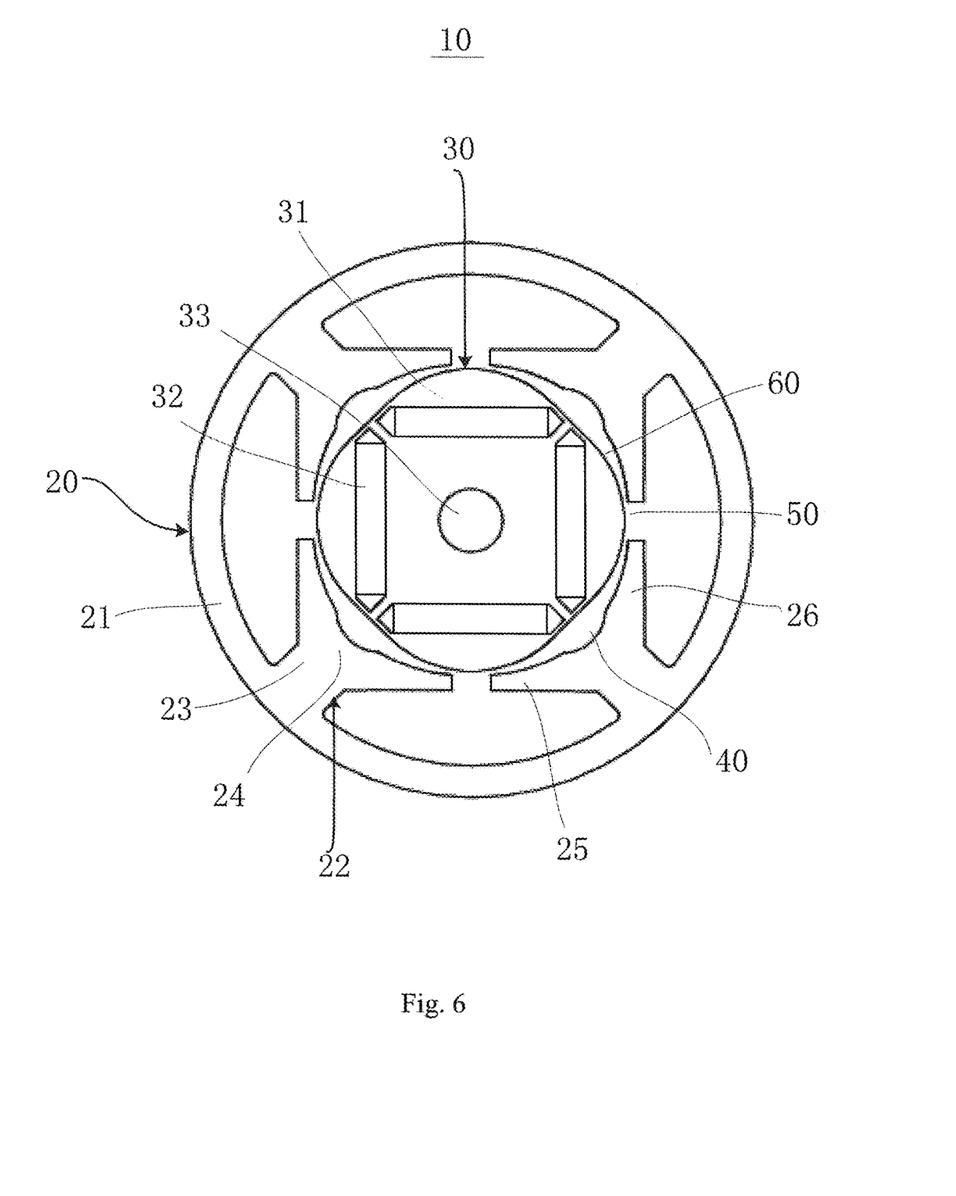
FIG. 6 and FIG. 7 are simplified schematic views of a single phase brushless motor according to a second embodiment of the present invention.

Referring to FIG. 6, different from the first embodiment, the cross section of the positioning groove 40 is arc-shaped.

In this embodiment, the circumferential width of the positioning groove 40 is equal to the circumferential width of the tooth body 23 of the tooth 22. In an alternative embodiment, the circumferential width of the positioning groove 40 is greater than or less than the circumferential width of the tooth body 23 of the tooth 22.

A slot opening 50 is formed between two adjacent pole shoes of the at least two different teeth 22. In this embodiment, the slot opening 50 has a rectangular-shaped cross section. The circumferential width of the positioning groove 40 is greater than the circumferential width of the slot opening 50. Preferably, the circumferential width of the slot opening 50 is greater than 2 mm and, more preferably, greater than 2.5 mm.

Figure 7:
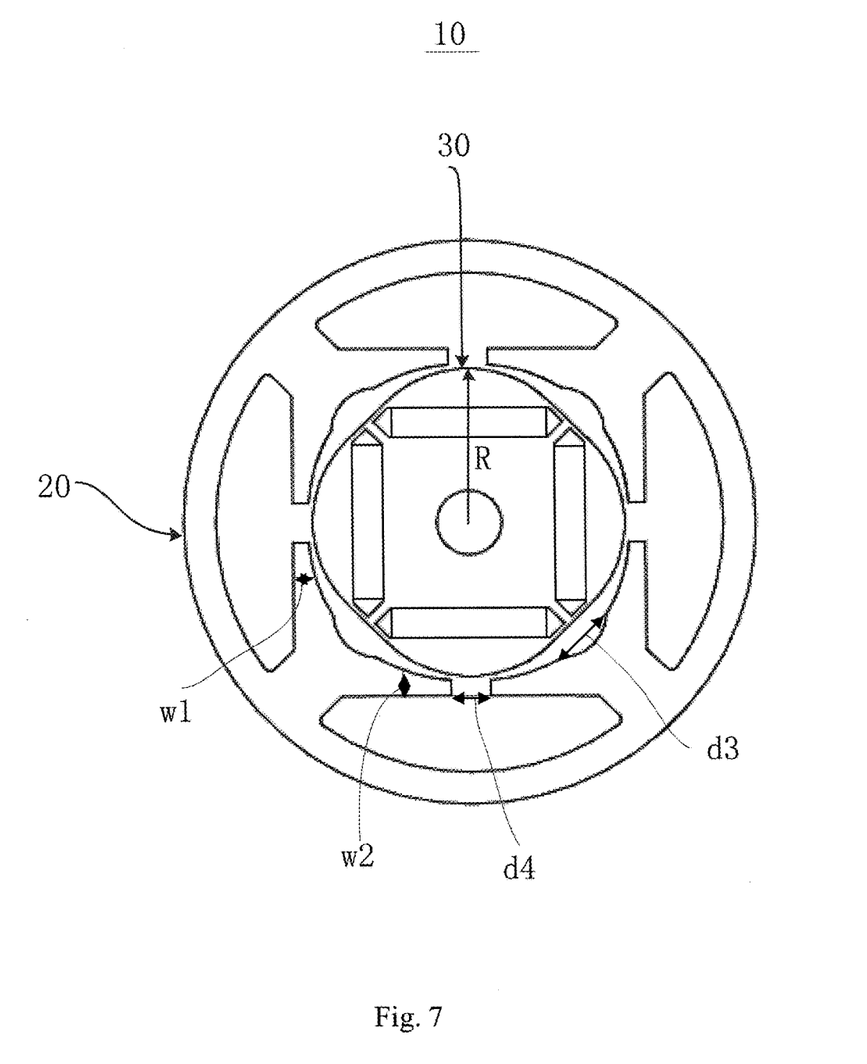

Referring to FIG. 7, the circumferential width of the slot opening 50 is indicated by d4, and the circumferential width of the opening of the positioning groove is indicated by d3, and d3>d4.

Another difference between this embodiment and the first embodiment is that the outer circumferential surface of the rotor 30 is a convex-concave arc-shaped structure, such that the outer circumferential surface of the rotor 30 is not located on a same cylindrical surface. In particular, the rotor 30 includes a rotary shaft 33, a rotor core 31 fixed around the rotary shaft 33, and a plurality of permanent magnets 32 embedded in the rotor core 31. The permanent magnets 32 form a plurality of permanent magnetic poles along a circumferential direction of the rotor 30. In this embodiment, each permanent magnet 32 forms one permanent magnetic pole at the outer circumference of the rotor 30. The number of the permanent magnetic poles is the same as the number of the teeth 22, which is four. An outer radius R of the rotor core 31 (referring to FIG. 7, also the outer radius of the rotor 30 in this embodiment) gradually decreases from a circumferential center toward two sides of each permanent magnet 32. A distance from the inner circumferential surfaces of the two pole shoes 25, 26 to the rotor center gradually increases in a direction approaching the center line of the tooth body 23. Therefore, when the rotor 30 stops, a part of the rotor core 31 with maximum outer radius (i.e. the circumferential center of the permanent magnet 32) is more likely adjacent to distal ends of two pole shoes 25, 26 of two adjacent teeth, which prevents the rotor 30 from stopping at the dead point position. This design can increase the slope of the increase of the cogging torque at the unstable point of the rotor 30, and increase the cogging torque of the motor 10 as well.

Figure 8:
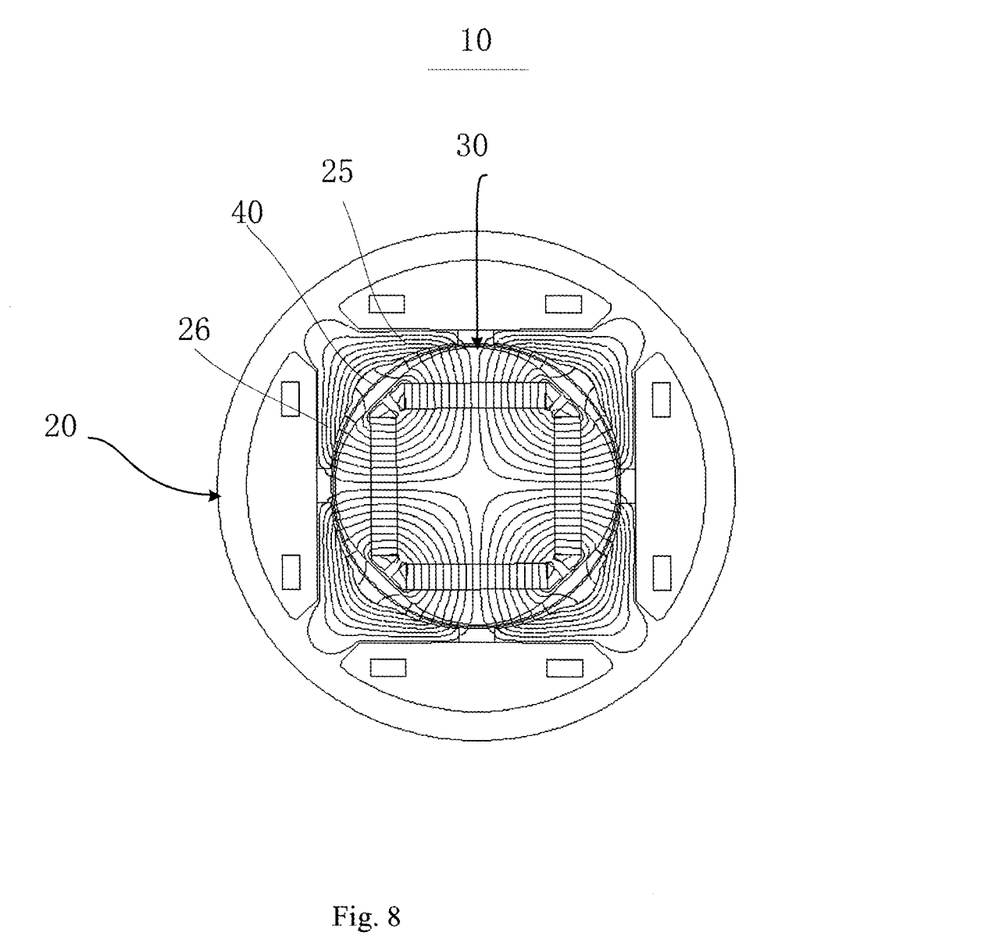
FIG. 8 illustrates a magnetic flux distribution of the single phase brushless motor of FIG. 6.

Referring to FIG. 8, when the rotor 30 stops, the center of the permanent magnetic pole is as close to the pole shoe as possible, and each two adjacent permanent magnetic poles form a magnetic circuit through the two pole shoes 25, 26 of one corresponding tooth 22. Because the two pole shoes 25, 26 of each tooth 22 are symmetrical with each other, the pole shoes 25, 26 have the same number of magnetic circuits passing therethrough, i.e. the number of the magnetic circuits on two sides of the positioning groove 40 is the same. As described above, at this position, the cogging torque is zero but the electromagnetic torque has the maximum value, thereby enhancing the startup capability of the motor 10, which is particularly suitable for use in applications having equal requirements for motor startup in both directions.

Third Embodiment

Figure 9:
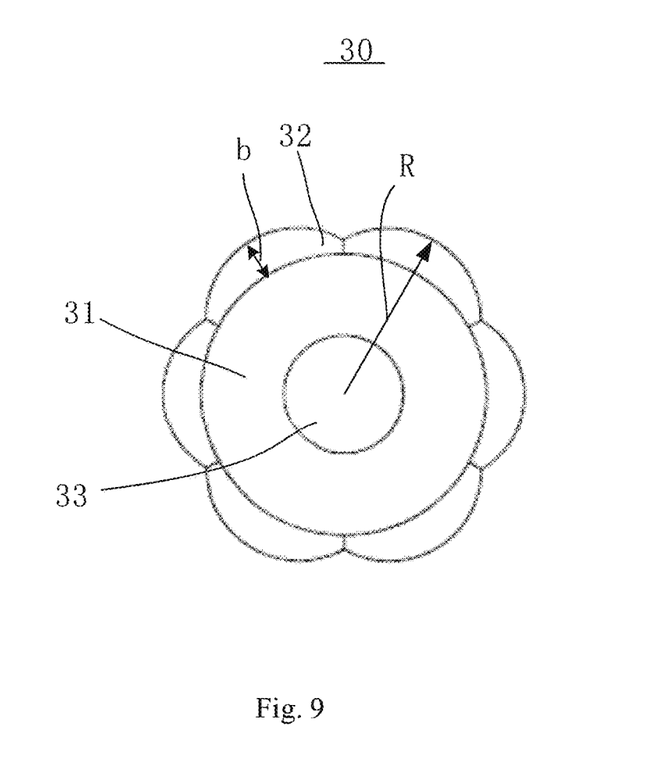
FIG. 9 is a simplified view of a rotor of a single phase brushless motor according to a third embodiment of the present invention.
Figure 10:
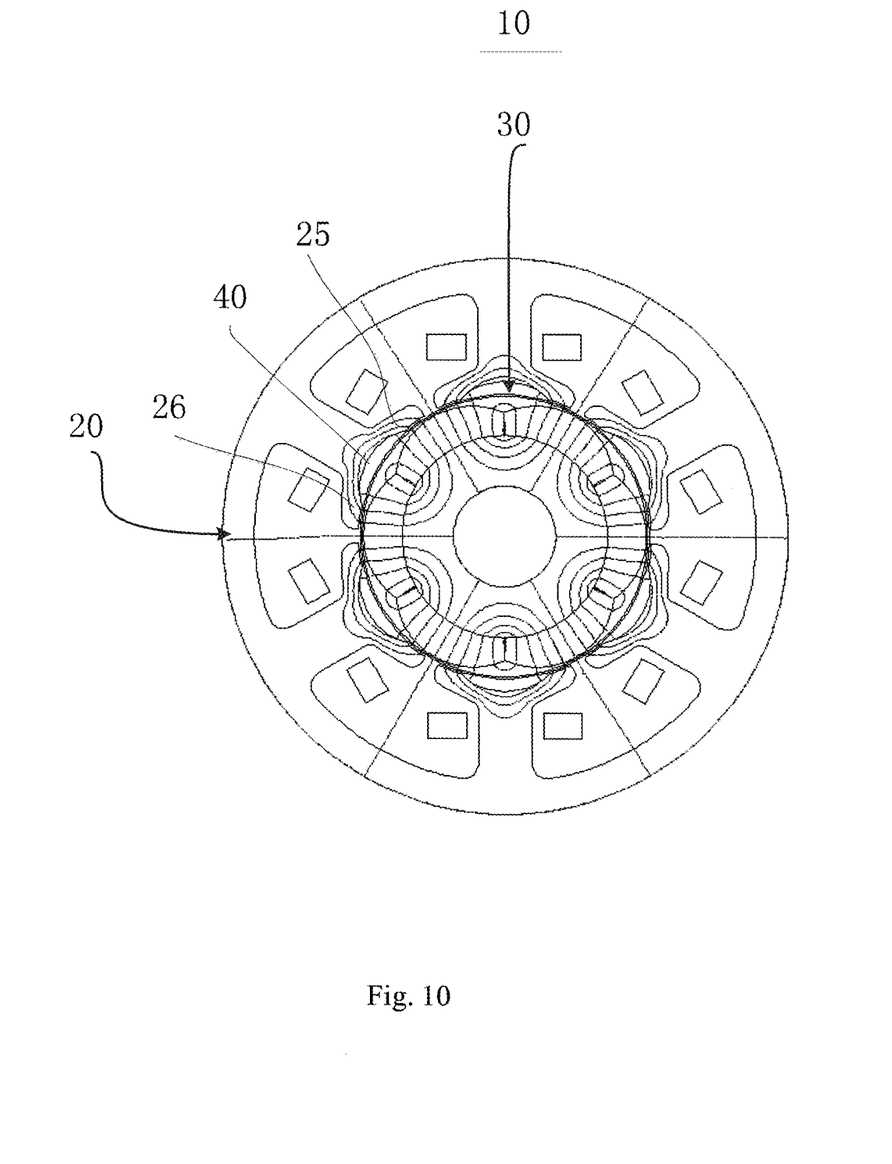
FIG. 10 illustrates a magnetic flux distribution of the single phase brushless motor of FIG. 9.

Referring to FIG. 9 and FIG. 10, in this embodiment, the rotor 30 includes a rotary shaft 33, a rotor core 31 fixedly mounted around the rotary shaft 33, and a plurality of permanent magnets 32 mounted to an outer circumference of the rotor core 31. Each permanent magnet 32 forms one permanent magnetic pole at the outer circumference of the rotor 30. In this embodiment, the number of the permanent magnetic poles is the same as the number of the teeth 22, which is six. The rotor magnetic core 31 is a cylindrical body. Each permanent magnet 32 has a thickness b gradually decreasing from a circumferential center to two sides thereof. Therefore, the outer radius R of the rotor 30 gradually decreases from the center to two sides of each permanent magnetic pole.

In this embodiment, pole faces of the two pole shoes 25, 26 of each tooth 22 are located on a same cylindrical surface, except for an area of the positioning groove 40. When the rotor 30 stops, a part of the permanent magnet 32 with maximum thickness b (i.e. the circumferential center of the permanent magnet 32) is close to the distal ends of the two pole shoes 25, 26, and each two adjacent permanent magnetic poles form a magnetic circuit through the two pole shoes 25, 26 of one corresponding tooth 22, thus preventing the rotor 30 from stopping at the dead point position. In addition, at this position, the cogging torque is zero but the electromagnetic torque has the maximum value, thereby enhancing the startup capability of the motor 10.

In the above embodiments of the present invention, the yoke 21 of the stator core is of a closed ring shape, in which case the stator windings can be mounted around the tooth bodies 23 of the teeth 22. It should be understood that the yoke 21 of the stator core may have a closed frame shape, such as rectangular shape. In this case, the stator core can be mounted around the tooth bodies 23 of the teeth 22. The yoke of the stator core may also be of an opened frame shape, such as U- or C-shape. In this case, the stator core can be mounted around the tooth bodies or yoke of the teeth.

In the above embodiments, the stator tooth is of a salient type, i.e. the pole shoes extend circumferentially from two sides of the tooth body. It should be understood that the stator tooth may also be of a non-salient type, i.e. the pole shoes do not extend outward circumferentially from two sides of the tooth body, but rather are hidden at the distal end of the tooth body.

Although the invention is described with reference to one or more preferred embodiments, it should be appreciated by those skilled in the art that various modifications are possible. Therefore, the scope of the invention is to be determined by reference to the claims that follow.

The invention claimed is:

1. A single phase brushless motor comprising:
a stator comprising a stator core and windings wound around the stator core, the stator core comprising a yoke and at least two teeth extending from the yoke, the tooth comprising a tooth body and a tooth tip disposed at a distal end of the tooth body, the tooth tip comprising a first pole shoe and a second pole shoe respectively extending to two sides of the tooth;
a rotor rotatable relative to the stator;
wherein the two pole shoes of each tooth are symmetrical about a center line of the tooth body of the tooth, each tooth defines a positioning groove facing the rotor between the two pole shoes, the pole shoes of adjacent two of the at least two teeth are spaced apart by a slot opening, and a width of the positioning groove is greater than a width of the slot opening, and
wherein a portion of a sidewall of the positioning groove adjacent a groove bottom of the positioning groove is steeper than a portion of the sidewall away from the groove bottom of the positioning groove.

2. The single phase brushless motor of claim 1, wherein the at least two teeth extend inward from the yoke, the first pole shoes and the second pole shoes of the at least two teeth define a space therebetween, and the rotor is rotatably received in the space.

3. The single phase brushless motor of claim 2, wherein the slot opening has a funnel-shaped cross section and has a width at a radial inner side less than a width at a radial outer side thereof, and the width of the positioning groove is greater than the width of the slot opening at the radial outer side thereof.

4. The single phase brushless motor of claim 3, wherein the width of the positioning groove is greater than two times of the width of the slot opening at the radial outer side thereof.

5. The single phase brushless motor of claim 2, wherein the slot opening has a rectangular shaped cross section.

6. The single phase brushless motor of claim 2, wherein the width of the positioning groove is greater than or equal to a width of the tooth body of the tooth.

7. The single phase brushless motor of claim 2, wherein a cross section of the positioning groove is V-shaped or arc-shaped.

8. The single phase brushless motor of claim 2, wherein the rotor comprises a plurality of permanent magnetic poles arranged along a circumferential direction of the rotor, an outer circumferential surface of the rotor is located on a same cylindrical surface, the two pole shoes of each tooth and the rotor define a gap therebetween with an even thickness.

9. The single phase brushless motor of claim 8, wherein the rotor comprises a rotor core, the permanent magnetic poles is formed by a permanent magnet arranged around an outer side of the rotor core.

10. The single phase brushless motor of claim 9, wherein a distance from an inner circumferential surface of each pole shoe to a center of the rotor gradually increases in a direction approaching a center line of the corresponding tooth body.

11. The single phase brushless motor of claim 2, wherein the rotor comprises a plurality of permanent magnetic poles arranged along a circumferential direction of the rotor, an outer radius of the rotor gradually decreases from a circumferential center to two circumferential sides of each permanent magnetic pole and the rotor is symmetrical about the circumferential center of the permanent magnetic pole.

12. The single phase brushless motor of claim 11, wherein the rotor further comprises a rotor core, the permanent magnetic poles are formed by a plurality of permanent magnets embedded in the rotor core, and an outer radius of the rotor core gradually decreases from the circumferential center to two sides of each permanent magnet.

13. The single phase brushless motor of claim 12, wherein a distance from an inner circumferential surface of each pole shoe to a center of the rotor gradually increases in a direction approaching a center line of the corresponding tooth body.

14. The single phase brushless motor of claim 11, wherein the rotor further comprises a rotor core, the permanent magnetic poles are formed by a plurality of permanent magnets mounted to an outer circumferential surface of the rotor core, the rotor core is a cylindrical body, and a thickness of each permanent magnet gradually decreases from the circumferential center to two sides of each permanent magnet.

15. The single phase brushless motor of claim 2, wherein a radial thickness of the two pole shoes of each tooth gradually decreases in a direction away from the positioning groove.

16. A power tool comprising a single phase brushless motor, the single phase brushless motor comprising:
a stator comprising a stator core and windings wound around the stator core, the stator core comprising a yoke and at least two teeth extending from the yoke, the tooth comprising a tooth body and a tooth tip disposed at a distal end of the tooth body, the tooth tip comprising a first pole shoe and a second pole shoe respectively extending to two sides of the tooth; and
a rotor rotatable relative to the stator;
wherein the two pole shoes of each tooth are symmetrical about a center line of the tooth body of the tooth, each tooth defines a positioning groove facing the rotor between the two pole shoes, the pole shoes of adjacent two of the at least two teeth are spaced apart by a slot opening, and a width of the positioning groove is greater than a width of the slot opening;
wherein the single phase brushless motor has bidirectional startup capability, and the startup capability in either direction is the same, and wherein a portion of a sidewall of the positioning groove adjacent a groove bottom of the positioning groove is steeper than a portion of the sidewall away from the groove bottom of the positioning groove.

* * * * *